UNITED STATES PATENT OFFICE.

ALPHONSO MORTON CLOVER, OF DETROIT, MICHIGAN, ASSIGNOR TO PARKE, DAVIS & COMPANY, OF DETROIT, MICHIGAN, A CORPORATION OF MICHIGAN.

PROCESS OF MANUFACTURING GLANDULAR EXTRACTIVE PRODUCT.

1,373,551. Specification of Letters Patent. Patented Apr. 5, 1921.

No Drawing. Application filed March 3, 1913. Serial No. 751,957.

*To all whom it may concern:*

Be it known that I, ALPHONSO MORTON CLOVER, a citizen of the United States, residing at Detroit, in the county of Wayne and State of Michigan, have invented certain new and useful Improvements in Processes of Manufacturing Glandular Extractive Product, of which the following is a specification.

My invention consists of a novel process of manufacturing in the form of a solid the active principle of the infundibular portion of the pituitary gland.

A water extract of the therapeutically active substance contained in the infundibular or posterior lobe of the pituitary gland, is at the present time made and sold by different manufacturers under different trade-names, such as Pituitrin; Pituglandol; Pituitary Extract, Vaporole; etc. This extract, when administered hypodermically, has the effect of increasing the blood-pressure and of stimulating uterine contractions. As a uterine stimulant its effect is especially pronounced just at the time of natural childbirth, and it is at present largely used for that purpose. In this respect it differs from ergot. The blood-pressure effect is similar to that produced by adrenalin (the blood-pressure-raising, hemostatic and astringent principle of suprarenal glands), but is much more prolonged.

The above extract has been found to be very unstable—that is, it decomposes on standing and becomes less and less effective. It is, therefore, desirable to isolate the active substance in a solid, friable or powdered state and in a soluble condition, in which condition it can be preserved indefinitely, and is immediately available for use by dissolving it when needed.

In practising my process I start with a water extract of the said infundibular lobe of the said gland and precipitate out of it the active principle by saturating it with a suitable salt. As an example of my process, the following may be given:

A water extract of the infundibular lobe of the pituitary gland may be obtained in any well-known or suitable way, for example, as by digesting the macerated material with hot acidulated water and removing the insoluble residue by filtration. This solution I saturate with a suitable water soluble salt preferably of the alkali or alkaline earth metals which should be freely soluble in water, non-toxic and neutral or slightly acid in reaction toward litmus such as sodium chlorid, sodium sulfate, magnesium sulfate, ammonium sulfate, etc., which precipitates the active principle from the solution. By preference I use sodium chlorid. The precipitate is filtered, dried in the air and powdered. The resulting product, when sodium chlorid is used, contains some sodium chlorid, but in commercial practice it is not necessary to remove this, as its presence is not objectionable; but it may, of course, be removed, if desired. By alkaline salt, as used in the claims, I include salts of the alkali metals and salts of the alkaline earth metals.

The process of removing the active principle by precipitation with sodium chlorid is almost, or practically, complete, provided the solution is sufficiently strong (say three parts of the solution representing one part of the infundibular portion of the gland), as the precipitated product when redissolved in water is nearly as potent therapeutically as the original solution. The precipitated product constitutes only a small portion of the extractive matter contained in the original solution, showing that a separation has been made, and that the active substance has been isolated from the inert and undesirable constituents of the solution.

The product is a white or nearly white fluffy powder which shows all the therapeutical properties of pituitary extract. That the product is a highly potent one therapeutically, that the inert and undesirable matter contained in the extract has been mostly eliminated, and that it is at least a close approximation to, if not the chemically pure active principle of the pituitary gland, may be judged from the fact that a fraction of a milligram of the active substance, exclusive of the sodium chlorid contained in the same as described above, is an active dose on the occasion of human child-birth.

A solution of the product is precipitated by many of the so-called alkaloidal precipitants, such as phospho-tungstic acid, picric acid, mercuric potassium iodid, platinic chlorid, etc. It gives what is known as Pauly's reaction, similar to histidin. It gives with Millon's reagent the characteristic reaction for proteid in which tyrosin is present. It gives the biuret reaction. It is soluble in water, preferably acidulated, and glycerin of all strengths; but is insoluble in strong alcohol, acetone, etc. On the other hand it gives no precipitate with mercuric bichlorid, ferric chlorid, and lead acetate when an excess of these reagents is not used so as to produce a salting out effect. It gives no precipitate with uranium acetate.

What I claim and desire to secure by Letters Patent of the United States is:—

1. The process of obtaining the active principle of the infundibular lobe of the pituitary gland in the form of a solid which consists in making a water extract of said lobe, and precipitating the active material therefrom by saturating it with a freely soluble, non-toxic, alkaline metal salt having a neutral or slightly acid reaction.

2. The process of obtaining the active principle of the infundibular lobe of the pituitary gland in the form of a solid which consists in making a water extract of said lobe, by treating the lobe with acidulated water, and precipitating the active material therefrom by saturating it with sodium chlorid.

3. The process of obtaining the active principle of the infundibular lobe of the pituitary gland in the form of a solid which consists in making a water extract of the gland by treating with acidulated water, heating and removing the insoluble residue formed, and precipitating the active material from the remaining solution by saturating it with a freely soluble, non-toxic, alkaline metal salt having a neutral or slightly acid reaction.

4. The process of obtaining the active principle of the infundibular lobe of the pituitary gland in the form of a solid which consists in making a water extract of the gland with hot acidulated water, removing the insoluble residue, and precipitating the active material from the remaining solution by saturating it with a freely soluble, non-toxic, alkaline metal salt having a neutral or slightly acid reaction.

5. The process of obtaining the active principle of the infundibular lobe of the pituitary gland in the form of a solid which consists in making a water extract of the gland with hot acidulated water, removing the insoluble residue, and precipitating the active material from the remaining solution by saturating it with sodium chlorid.

In testimony whereof I have hereunto signed my name in the presence of two subscribing witnesses.

ALPHONSO MORTON CLOVER.

Witnesses:
J. EDGAR BULL,
M. E. McNINCH.